US012577881B2

(12) United States Patent
Sippel et al.

(10) Patent No.: US 12,577,881 B2
(45) Date of Patent: Mar. 17, 2026

(54) TURBINE SHROUD ASSEMBLIES WITH ANTI-MIGRATION SEALS

(71) Applicant: Rolls-Royce Corporation, Indianapolis, IN (US)

(72) Inventors: Aaron D. Sippel, Indianapolis, IN (US); Ted J. Freeman, Indianapolis, IN (US); David J. Thomas, Indianapolis, IN (US); Clark J. Snyder, Indianapolis, IN (US); Grant Cook, Indianapolis, IN (US); James E. Shellhorn, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/680,309

(22) Filed: May 31, 2024

(65) Prior Publication Data

US 2025/0369366 A1 Dec. 4, 2025

(51) Int. Cl.
*F01D 11/08* (2006.01)
*F01D 25/24* (2006.01)

(52) U.S. Cl.
CPC .............. *F01D 11/08* (2013.01); *F01D 25/24* (2013.01); *F05D 2220/32* (2013.01); *F05D 2230/60* (2013.01); *F05D 2300/6033* (2013.01)

(58) Field of Classification Search
CPC ...... F01D 11/08; F01D 25/24; F05D 2220/32; F05D 2230/60; F05D 2300/6033
See application file for complete search history.

(56) References Cited

U.S. PATENT DOCUMENTS

| | | | |
|---|---|---|---|
| 7,207,771 | B2 | 4/2007 | Synnott et al. |
| 7,217,089 | B2 | 5/2007 | Durocher et al. |
| 7,374,395 | B2 | 5/2008 | Durocher et al. |
| 7,513,740 | B1 | 4/2009 | Hervy et al. |
| 7,600,967 | B2 | 10/2009 | Pezzetti, Jr. et al. |
| 7,771,159 | B2 | 8/2010 | Johnson et al. |
| 7,901,186 | B2 | 3/2011 | Cornett et al. |
| 8,206,087 | B2 | 6/2012 | Campbell et al. |
| 8,303,245 | B2 | 11/2012 | Foster et al. |

(Continued)

FOREIGN PATENT DOCUMENTS

| | | | |
|---|---|---|---|
| EP | 1965031 | A2 | 9/2008 |
| EP | 3543468 | A1 | 9/2019 |
| FR | 3056636 | A1 | 3/2018 |

*Primary Examiner* — Aaron R Eastman
(74) *Attorney, Agent, or Firm* — Barnes & Thornburg LLP

(57) ABSTRACT

A turbine shroud assembly includes a carrier segment, a blade track segment, and a buffer air seal assembly. The carrier segment includes a cantilevered wall extending radially inwardly within a recess so as to form a groove between the cantilevered wall and the inner wall of the recess. The carrier segment includes a second recess located at an end of the groove that opens deeper into the segment than the groove. The buffer air seal assembly includes first and second seal members arranged in the groove, the second seal member being arranged radially outward of the first seal member. A first end of the second seal member extends circumferentially beyond the first circumferential end of the first groove, and the first end of the second seal member extends radially outwardly into the second recess so as to block circumferential movement of the second seal member.

20 Claims, 12 Drawing Sheets

(56) References Cited

U.S. PATENT DOCUMENTS

| | | | |
|---|---|---|---|
| 8,641,371 | B2 | 2/2014 | Nakamura et al. |
| 8,651,497 | B2 | 2/2014 | Tholen et al. |
| 8,684,680 | B2 | 4/2014 | Martin et al. |
| 8,784,041 | B2 | 7/2014 | Durocher et al. |
| 8,845,285 | B2 | 9/2014 | Weber et al. |
| 8,905,708 | B2 | 12/2014 | Weber et al. |
| 9,079,245 | B2 | 7/2015 | Durocher et al. |
| 9,534,500 | B2 | 1/2017 | Bouchard et al. |
| 9,708,922 | B1 | 7/2017 | Davis et al. |
| 9,714,580 | B2 | 7/2017 | Slavens et al. |
| 9,745,854 | B2 | 8/2017 | Baldiga et al. |
| 9,759,079 | B2 | 9/2017 | Sippel et al. |
| 9,863,265 | B2 | 1/2018 | Stapleton |
| 9,863,323 | B2 | 1/2018 | Kirtley et al. |
| 9,869,201 | B2 | 1/2018 | Dyson et al. |
| 9,874,104 | B2 | 1/2018 | Shapiro |
| 9,915,162 | B2 | 3/2018 | Duguay |
| 9,945,484 | B2 | 4/2018 | Moehrle et al. |
| 9,957,827 | B2 | 5/2018 | Davis et al. |
| 9,982,550 | B2 | 5/2018 | Davis |
| 9,988,919 | B2 | 6/2018 | Davis et al. |
| 9,988,923 | B2 | 6/2018 | Snyder et al. |
| 10,012,099 | B2 | 7/2018 | Cetel et al. |
| 10,024,193 | B2 | 7/2018 | Shapiro |
| 10,072,517 | B2 | 9/2018 | Boeke et al. |
| 10,082,085 | B2 | 9/2018 | Thomas et al. |
| 10,087,771 | B2 | 10/2018 | Mcgarrah |
| 10,100,660 | B2 | 10/2018 | Sippel et al. |
| 10,132,197 | B2 | 11/2018 | Heitman et al. |
| 10,138,747 | B2 | 11/2018 | Dev et al. |
| 10,138,750 | B2 | 11/2018 | Mccaffrey et al. |
| 10,167,957 | B2 | 1/2019 | Davis et al. |
| 10,202,863 | B2 | 2/2019 | Davis et al. |
| 10,240,476 | B2 * | 3/2019 | Varney .................. F01D 11/005 |
| 10,265,806 | B2 | 4/2019 | Cui et al. |
| 10,281,045 | B2 | 5/2019 | Sippel et al. |
| 10,301,955 | B2 | 5/2019 | Vetters et al. |
| 10,301,960 | B2 | 5/2019 | Stapleton et al. |
| 10,378,385 | B2 | 8/2019 | Tesson et al. |
| 10,378,386 | B2 | 8/2019 | Roussille et al. |
| 10,415,426 | B2 | 9/2019 | Quennehen et al. |
| 10,415,427 | B2 | 9/2019 | Quennehen et al. |
| 10,422,241 | B2 | 9/2019 | Mccaffrey et al. |
| 10,428,688 | B2 | 10/2019 | Quennehen et al. |
| 10,428,953 | B2 | 10/2019 | Lutjen et al. |
| 10,443,419 | B2 | 10/2019 | Thomas et al. |
| 10,443,420 | B2 | 10/2019 | Sippel et al. |
| 10,465,545 | B2 | 11/2019 | Cetel et al. |
| 10,533,446 | B2 | 1/2020 | Barak et al. |
| 10,550,706 | B2 | 2/2020 | Lutjen et al. |
| 10,577,963 | B2 | 3/2020 | Mccaffrey |
| 10,577,977 | B2 | 3/2020 | Baucco |
| 10,584,605 | B2 | 3/2020 | Sippel et al. |
| 10,590,803 | B2 | 3/2020 | Quennehen et al. |
| 10,598,045 | B2 | 3/2020 | Tableau et al. |
| 10,605,120 | B2 | 3/2020 | Quennehen et al. |
| 10,619,517 | B2 | 4/2020 | Quennehen et al. |
| 10,626,745 | B2 | 4/2020 | Roussille et al. |
| 10,633,994 | B2 | 4/2020 | Barker |
| 10,648,362 | B2 | 5/2020 | Groves, II et al. |
| 10,655,495 | B2 | 5/2020 | Groves, II et al. |
| 10,655,501 | B2 | 5/2020 | Lepretre et al. |
| 10,662,794 | B2 | 5/2020 | Das |
| 10,689,998 | B2 | 6/2020 | Stapleton et al. |
| 10,690,007 | B2 | 6/2020 | Quennehen et al. |
| 10,704,404 | B2 | 7/2020 | Shi et al. |
| 10,718,226 | B2 | 7/2020 | Vetters et al. |
| 10,724,399 | B2 | 7/2020 | Carlin et al. |
| 10,731,494 | B2 | 8/2020 | Dev et al. |
| 10,731,509 | B2 | 8/2020 | Correia et al. |
| 10,738,643 | B2 | 8/2020 | Mccaffrey et al. |
| 10,753,221 | B2 | 8/2020 | Barker et al. |
| 10,787,924 | B2 | 9/2020 | Quennehen et al. |
| 10,794,204 | B2 | 10/2020 | Fitzpatrick et al. |
| 10,801,345 | B2 | 10/2020 | Clum et al. |
| 10,801,349 | B2 | 10/2020 | Mccaffrey |
| 10,815,807 | B2 | 10/2020 | Vantassel et al. |
| 10,815,810 | B2 | 10/2020 | Barker et al. |
| 10,830,357 | B2 | 11/2020 | Mccaffrey et al. |
| 10,890,079 | B2 | 1/2021 | Propheter-Hinckley et al. |
| 10,907,487 | B2 | 2/2021 | Zurmehly et al. |
| 10,907,501 | B2 | 2/2021 | Filippi et al. |
| 10,934,872 | B2 | 3/2021 | Tableau et al. |
| 10,934,873 | B2 | 3/2021 | Sarawate et al. |
| 10,968,761 | B2 | 4/2021 | Barker et al. |
| 10,968,777 | B2 | 4/2021 | Propheter-Hinckley et al. |
| 10,982,559 | B2 | 4/2021 | Filippi |
| 11,002,144 | B2 | 5/2021 | Azad et al. |
| 11,015,613 | B2 | 5/2021 | Kerns et al. |
| 11,021,988 | B2 | 6/2021 | Tableau et al. |
| 11,021,990 | B2 | 6/2021 | Filippi |
| 11,028,720 | B2 | 6/2021 | Tableau et al. |
| 11,041,399 | B2 | 6/2021 | Lutjen et al. |
| 11,047,245 | B2 | 6/2021 | Mccaffrey |
| 11,066,947 | B2 | 7/2021 | Sippel et al. |
| 11,073,045 | B2 | 7/2021 | Sippel et al. |
| 11,078,804 | B2 | 8/2021 | Tableau et al. |
| 11,085,316 | B2 | 8/2021 | Barker et al. |
| 11,085,317 | B2 | 8/2021 | Johnson et al. |
| 11,105,215 | B2 | 8/2021 | Roy Thill et al. |
| 11,111,794 | B2 | 9/2021 | Bitzko et al. |
| 11,111,802 | B2 | 9/2021 | Propheter-Hinckley et al. |
| 11,111,822 | B2 | 9/2021 | Tableau et al. |
| 11,111,823 | B2 | 9/2021 | Jarrossay et al. |
| 11,125,096 | B2 | 9/2021 | Clark et al. |
| 11,125,098 | B2 | 9/2021 | Barker et al. |
| 11,143,050 | B2 | 10/2021 | Roy Thill et al. |
| 11,149,574 | B2 | 10/2021 | Laroche |
| 11,174,747 | B2 | 11/2021 | Roy Thill et al. |
| 11,174,795 | B2 | 11/2021 | Lutjen et al. |
| 11,181,006 | B2 | 11/2021 | Smoke et al. |
| 11,187,094 | B2 | 11/2021 | Feldmann et al. |
| 11,215,064 | B2 | 1/2022 | Arbona et al. |
| 11,215,065 | B2 | 1/2022 | Starr et al. |
| 11,215,081 | B2 | 1/2022 | Schilling et al. |
| 11,248,480 | B2 | 2/2022 | Thirumalai et al. |
| 11,255,208 | B2 | 2/2022 | Clark et al. |
| 11,255,209 | B2 | 2/2022 | Clark et al. |
| 11,286,812 | B1 | 3/2022 | Freeman et al. |
| 11,313,242 | B2 | 4/2022 | Cetel et al. |
| 11,319,827 | B2 | 5/2022 | Clark et al. |
| 11,319,828 | B1 | 5/2022 | Freeman et al. |
| 11,326,463 | B2 | 5/2022 | Blaney et al. |
| 11,326,470 | B2 | 5/2022 | Dyson et al. |
| 11,346,237 | B1 | 5/2022 | Freeman et al. |
| 11,346,251 | B1 | 5/2022 | Freeman et al. |
| 11,365,635 | B2 | 6/2022 | Read et al. |
| 11,441,434 | B2 | 9/2022 | Danis et al. |
| 11,441,441 | B1 | 9/2022 | Freeman et al. |
| 11,466,585 | B2 | 10/2022 | Arbona et al. |
| 11,466,586 | B2 | 10/2022 | Sippel et al. |
| 11,499,444 | B1 | 11/2022 | Freeman et al. |
| 11,506,085 | B2 | 11/2022 | Jarrossay et al. |
| 11,542,825 | B2 | 1/2023 | Hauswirth et al. |
| 11,542,827 | B2 | 1/2023 | Quennehen et al. |
| 11,624,291 | B2 | 4/2023 | Roy Thill et al. |
| 11,624,292 | B2 | 4/2023 | Clark et al. |
| 11,629,607 | B2 | 4/2023 | Freeman et al. |
| 11,643,939 | B2 | 5/2023 | Stoyanov et al. |
| 11,702,948 | B2 | 7/2023 | Hock et al. |
| 11,702,949 | B2 | 7/2023 | Freeman et al. |
| 11,713,694 | B1 | 8/2023 | Freeman et al. |
| 11,732,604 | B1 | 8/2023 | Freeman et al. |
| 11,761,351 | B2 | 9/2023 | Freeman et al. |
| 11,773,751 | B1 | 10/2023 | Freeman et al. |
| 11,781,440 | B2 | 10/2023 | Vincent et al. |
| 11,781,448 | B1 | 10/2023 | Holleran |
| 11,840,930 | B2 | 12/2023 | Propheter-Hinckley et al. |
| 11,840,936 | B1 | 12/2023 | Freeman et al. |
| 11,879,349 | B2 | 1/2024 | Schilling et al. |
| 2023/0184124 | A1 | 6/2023 | Stoyanov et al. |

(56) References Cited

U.S. PATENT DOCUMENTS

| | | | |
|---|---|---|---|
| 2023/0332506 | A1 | 10/2023 | Freeman et al. |
| 2024/0003267 | A1 | 1/2024 | Cazin et al. |

* cited by examiner

TURBINE SHROUD ASSEMBLIES WITH ANTI-MIGRATION SEALS

FIELD OF THE DISCLOSURE

The present disclosure relates generally to gas turbine engines, and more specifically to ceramic matrix composite components for use in the gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional fasteners such as rivets or bolts may not allow for the differing levels of expansion and contraction during operation of the gas turbine engine.

SUMMARY

The present disclosure may comprise one or more of the following features and combinations thereof.

According to a first aspect of the present disclosure, a turbine shroud assembly for use with a gas turbine engine includes a carrier segment, a blade track segment, and a buffer air seal assembly. The carrier segment is made of metallic materials and is arranged circumferentially at least partway around an axis, the carrier segment including an outer wall, a first support wall that extends radially inward from the outer wall and is formed to include a first recess that opens radially inwardly and extends circumferentially at least partway around the axis, and a first cantilevered wall extending radially inwardly from a first recess top wall of the first recess and spaced apart from opposing inner walls of the first recess so as to form a first groove between a first inner wall of the first recess and a first outer wall of the first cantilevered wall that faces the first inner wall, the first cantilevered wall and the first groove extending circumferentially at least partway around the axis.

In some embodiments, the carrier segment further includes at least one buffer air passageway that extends radially through the first support wall and the first cantilevered wall and is configured to discharge high-pressure buffer air, the first support wall being formed to further include a second recess located at a first circumferential end of the first groove that opens radially inwardly. The second recess includes a second recess top wall that is radially outwardly spaced apart from the first recess top wall such that a second radial depth of the second recess is greater than a first radial depth of the first recess. The blade track segment is made of ceramic matrix composite materials and includes a shroud wall that extends circumferentially partway around the axis and an attachment feature configured to be coupled to the carrier segment.

In some embodiments, the buffer air seal assembly is located radially between the carrier segment and the shroud wall of the blade track segment and includes a first tandem seal arranged in the first groove. The first tandem seal includes first and second seal members that each extend circumferentially at least partway about the axis, and the second seal member is arranged radially outward of the first seal member within the first groove. A first end of the second seal member extends circumferentially beyond the first circumferential end of the first groove, and the first end of the second seal member extends at least partially radially outwardly into the second recess so as to block movement of the second seal member in a first circumferential direction.

In some embodiments, the first support wall is further formed to include a third recess located at a second circumferential end of the first groove opposite the first circumferential end that opens radially inwardly.

In some embodiments, the third recess includes a third recess top wall that is radially outwardly spaced apart from the first recess top wall such that a third radial depth of the third recess is greater than the first radial depth of the first recess, a second end of the second seal member opposite the first end extends circumferentially beyond the second circumferential end of the first groove, and the second end of the second seal member extends at least partially radially outwardly into the third recess so as to block movement of the second seal member in a second circumferential direction opposite the first circumferential direction.

In some embodiments, the first support wall of the carrier segment is further formed to include a second groove between a second inner wall of the first recess opposite the first inner wall and a second outer wall of the first cantilevered wall that faces the second inner wall and is opposite the first outer wall.

In some embodiments, the second and third recesses each have an axial width that enables both of the first groove and the second groove to open into the second and third recesses.

In some embodiments, the buffer air seal assembly further includes a second tandem seal arranged in the second groove and including third and fourth seal members that each extend circumferentially at least partway about the axis, and the fourth seal member is arranged radially outward of the third seal member within the second groove.

In some embodiments, a first end of the fourth seal member extends circumferentially beyond a first circumferential end of the second groove, a second end of the fourth seal member extends circumferentially beyond a second circumferential end of the second groove, and the first and second end of the fourth seal member extend at least partially radially outwardly into the second and third recesses, respectively, so as to block movement of the fourth seal member in the first and second circumferential directions.

In some embodiments, the at least one buffer air passageway includes a plurality of buffer air passageways that are circumferentially spaced apart and extend through the first cantilevered wall.

In some embodiments, the first support wall is a forward-most support wall of the carrier segment.

In some embodiments, the first seal member is a wire seal and the second seal member is a braid seal that is compressible, and the second seal member is configured to be compressed between the carrier segment and the first seal member to bias the first seal member into engagement with the shroud wall of the blade track segment.

In some embodiments, the second seal member comprises a braid of metallic material, and the second seal member comprises a ceramic-containing core surrounded by the braid of metallic material.

In some embodiments, the first seal member comprises a single strand of solid metallic material.

According to a further aspect of the present disclosure, a turbine shroud assembly for use with a gas turbine engine includes a carrier segment including a first support wall including a first recess that opens radially inwardly, a first cantilevered wall within the first recess and a first groove formed between a first inner wall of the first recess and the first cantilevered wall, the first cantilevered wall and the first groove extending circumferentially at least partway around the axis, the first support wall further including a second recess located at a first circumferential end of the first groove that opens radially inwardly.

In some embodiments, the turbine shroud assembly further includes a blade track segment coupled to the carrier segment, and a buffer air seal assembly including a first tandem seal arranged in the first groove. The first tandem seal includes first and second seal members that each extend circumferentially at least partway about the axis, a first end of the second seal member extends circumferentially beyond the first circumferential end of the first groove, and the first end of the second seal member extends at least partially radially outwardly into the second recess so as to block movement of the second seal member in a first circumferential direction.

In some embodiments, the second recess includes a second recess top wall that is radially outwardly spaced apart from a first recess top wall of the first recess such that a second radial depth of the second recess is greater than a first radial depth of the first recess.

In some embodiments, the carrier segment further including a buffer air passageway that extends radially through the first support wall and the first cantilevered wall, the buffer air seal assembly is located radially between the carrier segment and a shroud wall of the blade track segment, and the second seal member is arranged radially outward of the first seal member.

In some embodiments, the first support wall is further formed to include a third recess located at a second circumferential end of the first groove opposite the first circumferential end that opens radially inwardly.

In some embodiments, the third recess includes a third recess top wall that is radially outwardly spaced apart from the first recess top wall such that a third radial depth of the third recess is greater than the first radial depth of the first recess, a second end of the second seal member opposite the first end extends circumferentially beyond the second circumferential end of the first groove, and the second end of the second seal member extends at least partially radially outwardly into the third recess so as to block movement of the second seal member in a second circumferential direction opposite the first circumferential direction.

In some embodiments, the first support wall of the carrier segment is further formed to include a second groove between a second inner wall of the first recess opposite the first inner wall and the first cantilevered wall, and the second and third recesses each have an axial width that enables both of the first groove and the second groove to open into the second and third recesses.

In some embodiments, the buffer air seal assembly further includes a second tandem seal arranged in the second groove and including third and fourth seal members that each extend circumferentially at least partway about the axis, the fourth seal member is arranged radially outward of the third seal member within the second groove, a first end of the fourth seal member extends circumferentially beyond a first circumferential end of the second groove, a second end of the fourth seal member extends circumferentially beyond a second circumferential end of the second groove, and the first and second end of the fourth seal member extend at least partially radially outwardly into the second and third recesses, respectively, so as to block movement of the fourth seal member in the first and second circumferential directions.

According to a further aspect of the present disclosure, a method includes arranging a carrier segment made of metallic materials circumferentially at least partway around an axis, the carrier segment including an outer wall and a first support wall that extends radially inward from the outer wall, forming the first support wall to include a first recess that opens radially inwardly and extends circumferentially at least partway around the axis, and a first cantilevered wall extending radially inwardly from a first recess top wall of the first recess and spaced apart from opposing inner walls of the first recess so as to form a first groove between a first inner wall of the first recess and a first outer wall of the first cantilevered wall that faces the first inner wall, the first cantilevered wall and the first groove extending circumferentially at least partway around the axis, forming at least one buffer air passageway in the carrier segment that extends radially through the first support wall and the first cantilevered wall and is configured to discharge high-pressure buffer air, and forming the first support wall to further include a second recess located at a first circumferential end of the first groove that opens radially inwardly, wherein the second recess includes a second recess top wall that is radially outwardly spaced apart from the first recess top wall such that a second radial depth of the second recess is greater than a first radial depth of the first recess.

In some embodiments, the method further includes coupling an attachment feature of a blade track segment made of ceramic matrix composite materials to the carrier segment, the blade track segment including a shroud wall that extends circumferentially partway around the axis, arranging a buffer air seal assembly radially between the carrier segment and the shroud wall of the blade track segment, the buffer air seal assembly including a first tandem seal arranged in the first groove, wherein the first tandem seal includes first and second seal members that each extend circumferentially at least partway about the axis, wherein the second seal member is arranged radially outward of the first seal member within the first groove, and arranging the second seal member such that a first end of the second seal member extends circumferentially beyond the first circumferential end of the first groove, wherein the first end of the second seal member extends at least partially radially outwardly into the second recess so as to block movement of the second seal member in a first circumferential direction.

These and other features of the present disclosure will become more apparent from the following description of the illustrative embodiments.

DETAILED DESCRIPTION OF THE DRAWINGS

Figure 1:
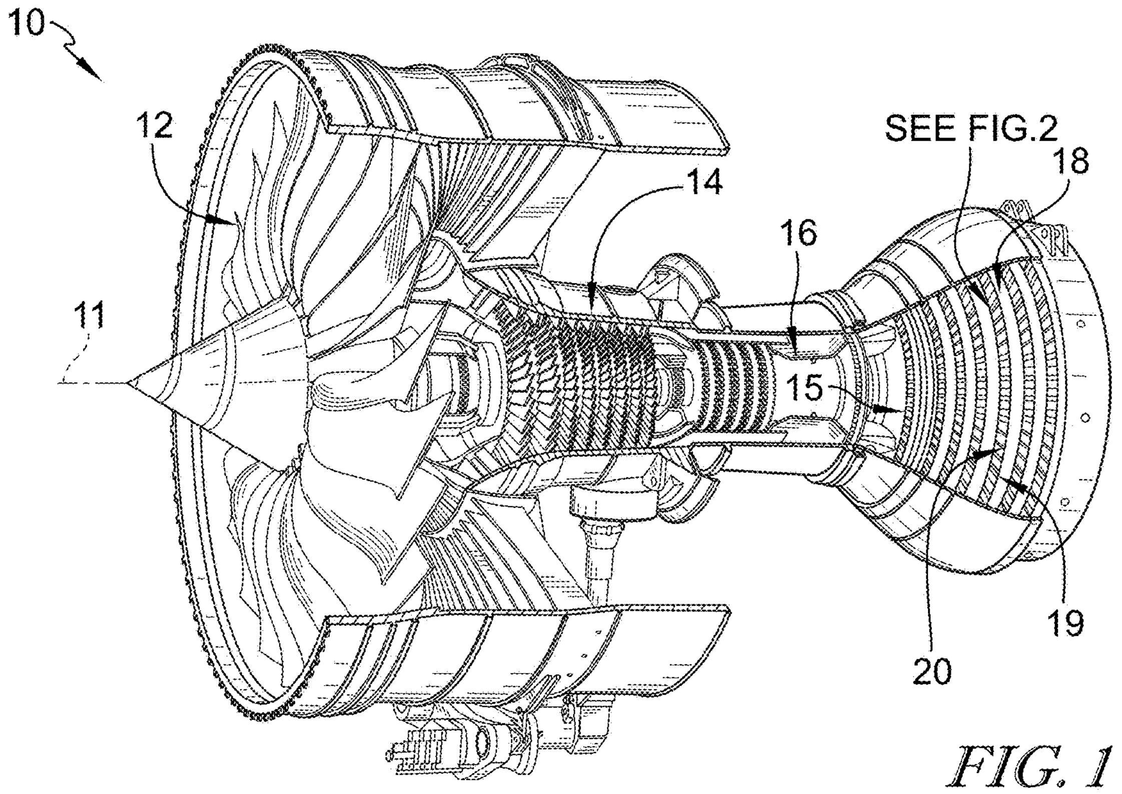
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

Figure 9:
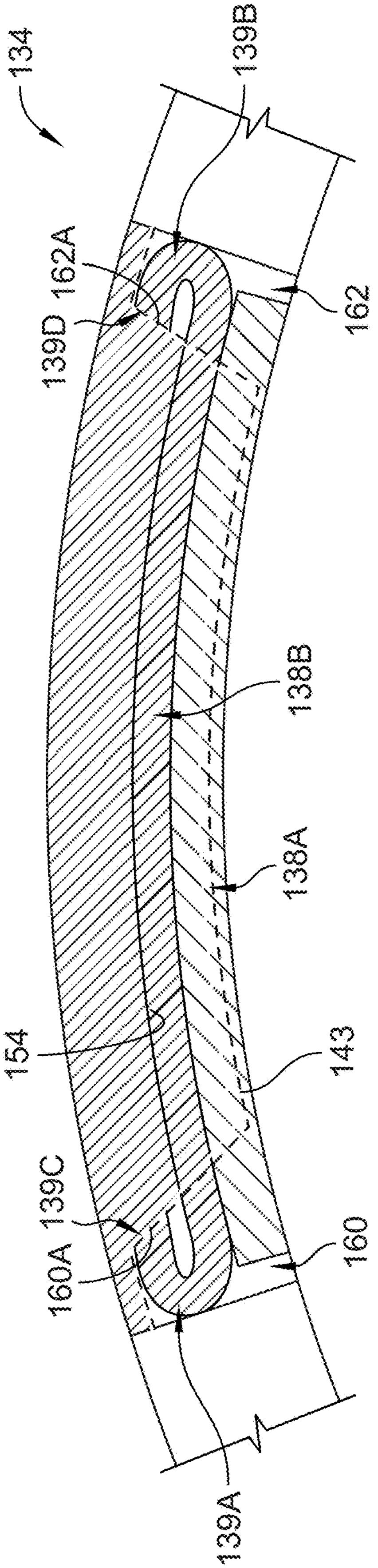
FIG. 9 is a side cross-sectional view of the turbine shroud assembly of FIGS. 3-7 taken through line 8-8 shown in FIG. 6, showing an alternative configuration of the ends of the second seal members, which are configured to fold over inwardly towards circumferentially inner walls of the second and third recesses.
Figure 10:
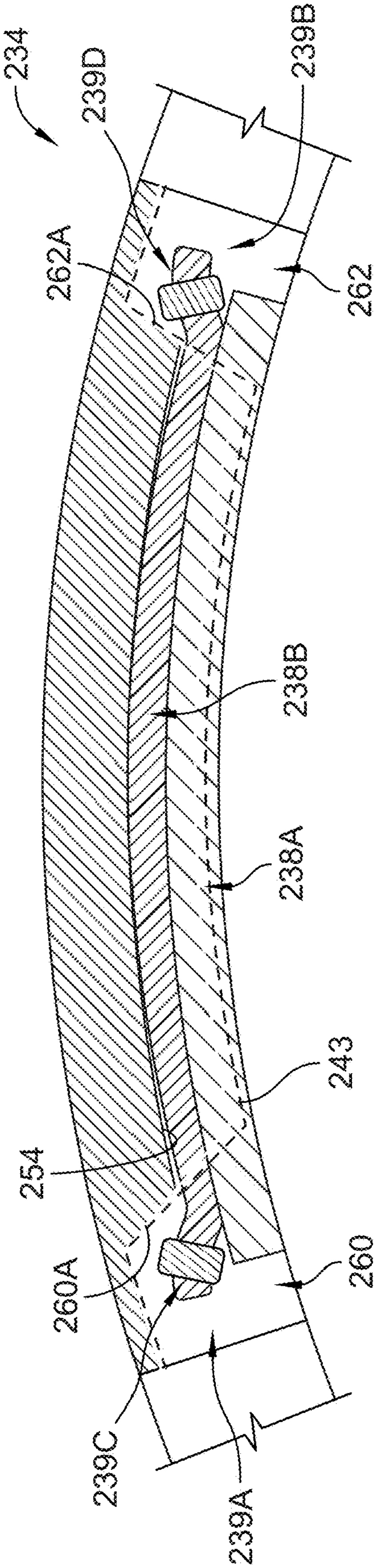
FIG. 10 is a side cross-sectional view of the turbine shroud assembly of FIGS. 3-7 taken through line 8-8 shown in FIG. 6, showing an alternative configuration of the ends of the second seal members, which are configured to be welded over each other to form knots.
Figure 11:
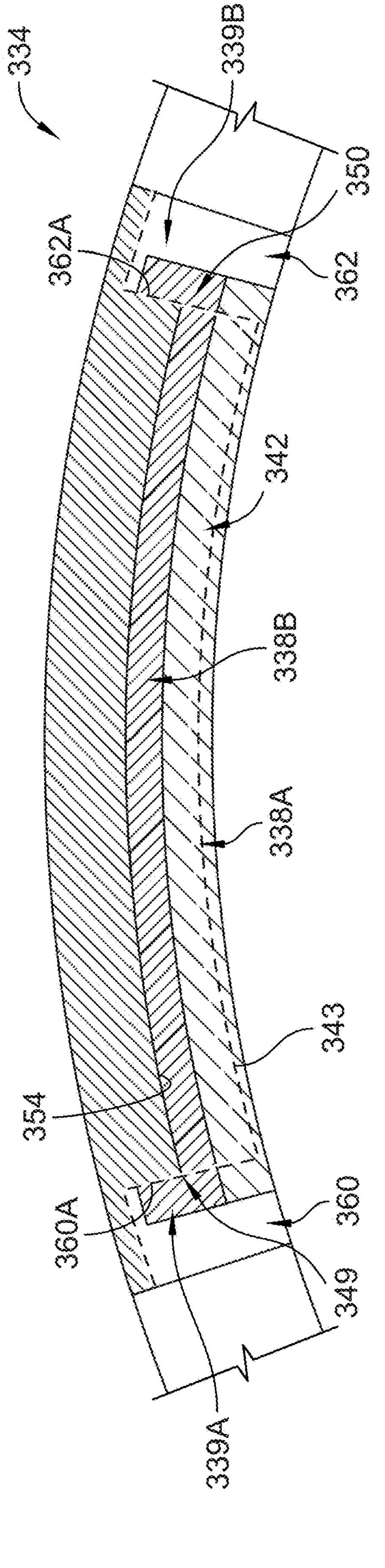
FIG. 11 is a side cross-sectional view of the turbine shroud assembly of FIGS. 3-7 taken through line 8-8 shown in FIG. 6, showing an alternative configuration of the ends of the second seal members, which are configured to be bent at approximately an orthogonal angle in order to crimp the ends.
Figure 12:
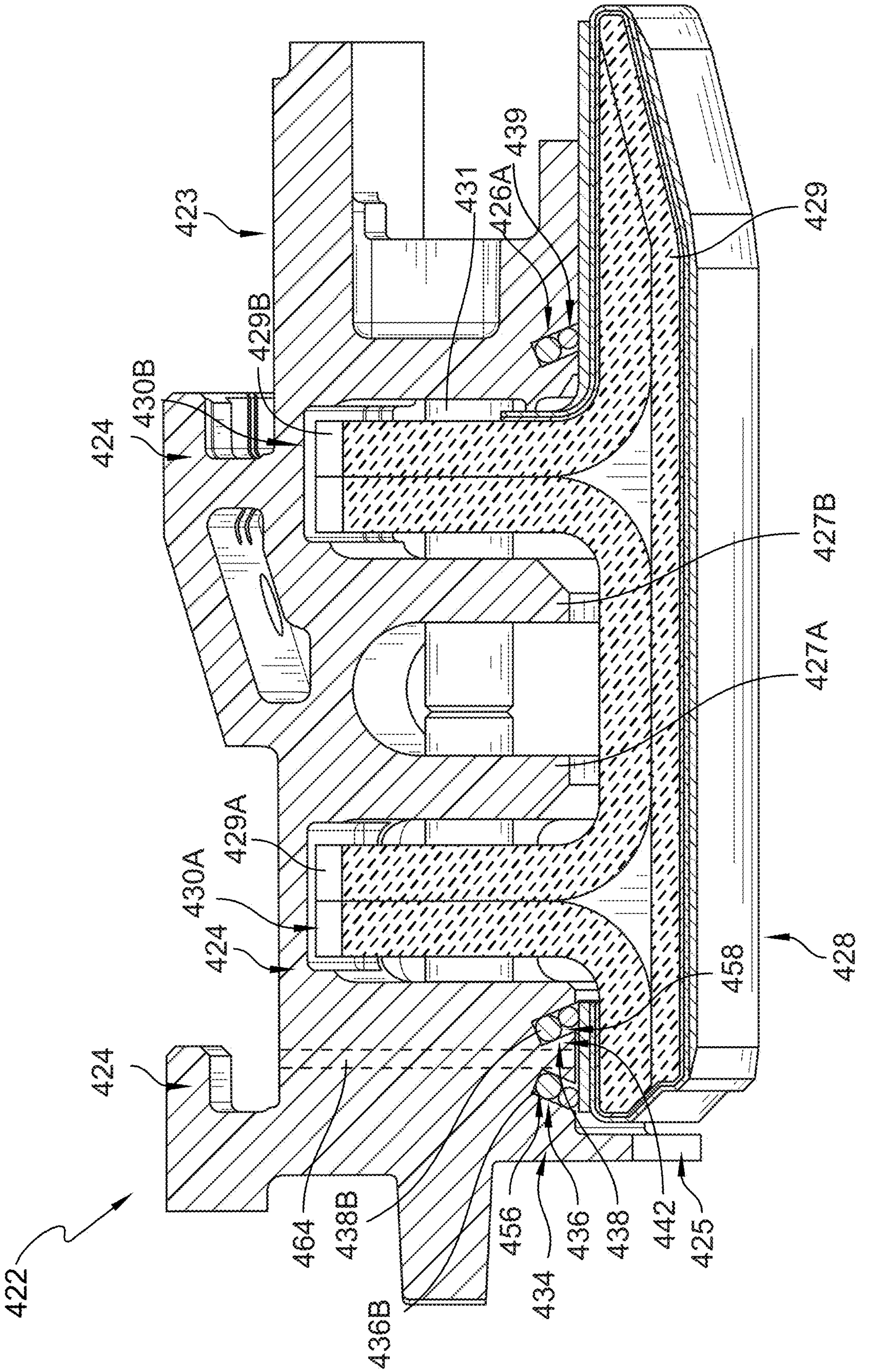
FIG. 12 is side cross-sectional view of a turbine shroud assembly according to a further aspect of the present disclosure, showing that a first support wall of the carrier segment includes a circumferentially extending first recess having a first cantilevered wall therewithin and defining two circumferentially extending grooves, showing that the buffer air seal assembly can include first and second tandem seals arranged within the grooves, and showing that the first cantilevered wall includes axially outer walls that are angled.
Figure 13:
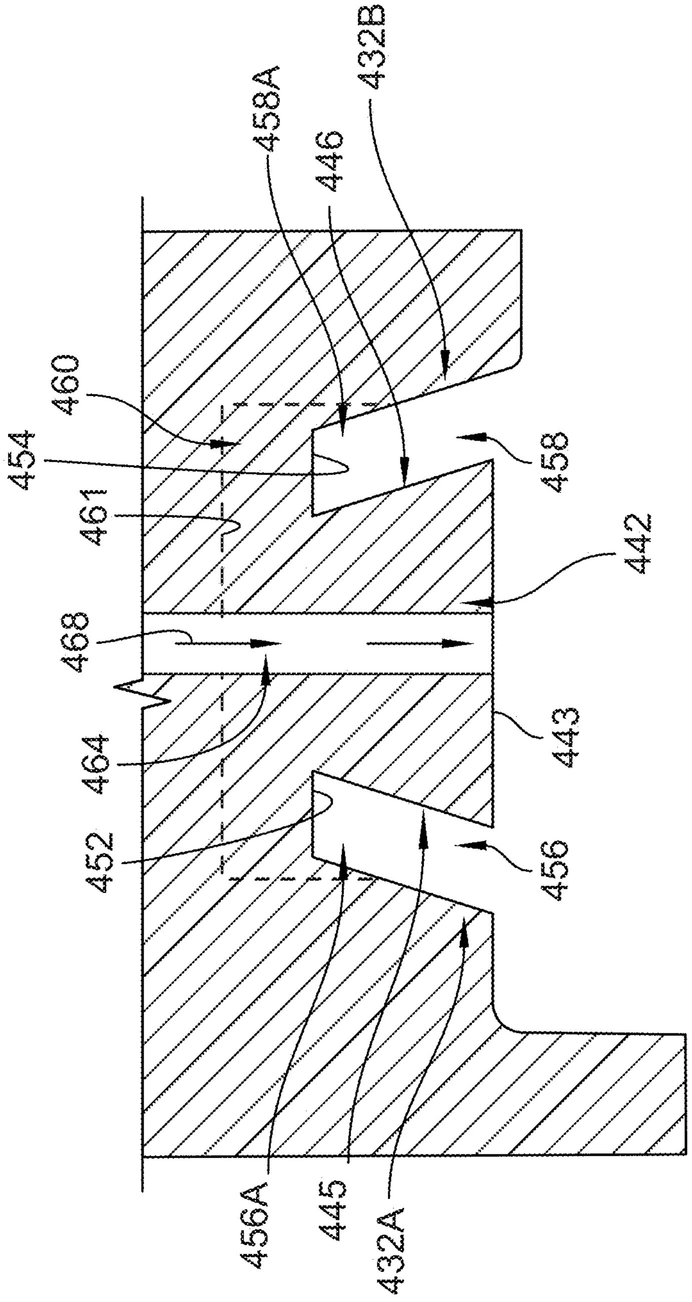
FIG. 13 is a cross-sectional magnified view of the turbine shroud assembly of FIG. 12, showing the grooves without the seals therewithin, and showing that the first support wall further includes a second recess formed at a first circumferential end of the grooves that opens radially inwardly.

A turbine shroud segment 22, also referred to herein as a turbine shroud assembly 22, according to a first aspect of the present disclosure for use in a turbine shroud 20 of a turbine 18 of a gas turbine engine 10 (as illustrated in FIG. 1) is shown in FIGS. 2-8. Alternative configurations of the seal members of the turbine shroud segment 22 are shown in FIGS. 9-11. A turbine shroud segment 422 according to a further aspect of the present disclosure is shown in FIGS. 12 and 13.

In at least one embodiment, the turbine shroud assembly 22 includes a carrier segment 23 having a circumferentially extending recess 32 formed therein, the recess 32 including a first cantilevered wall 42 therein that defines two grooves 56, 58 within the recess 32. Two tandem seals 36, 38 are arranged within the grooves 56, 58, respectively, each tandem seal including a radially inward first seal member 36A, 38A and a radially second outward seal member 36B, 38B. The carrier segment 23 further includes second and third recesses 60, 62 formed on opposing ends of the recess 32 such that the grooves 56, 58 open into the recesses 60 62. The recesses 60, 62 are radially deeper than the grooves 56, 58 such that the ends of the second seal members 36B, 38B can fold at least partially radially outwardly into the recesses 60, 62 so as to block circumferential movement of the second seal members 36B, 38B.

Figure 4:
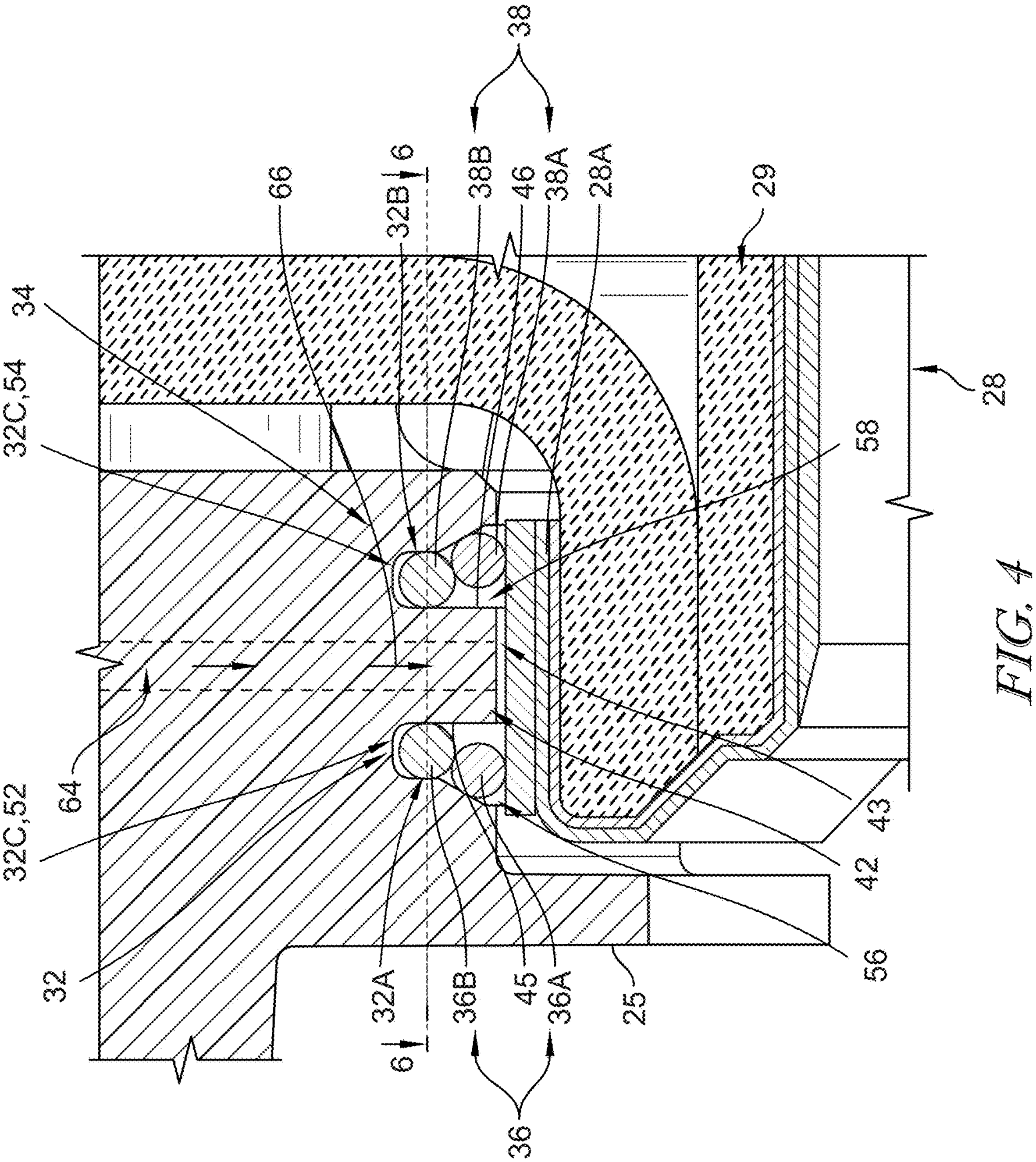
FIG. 4 is a cross-sectional magnified view of the turbine shroud assembly of FIG. 3, showing that the first and second tandem seals each include a first seal member and a second seal member arranged radially outwardly of the first seal member, and showing that a buffer air passageway extends through the first support wall and the first cantilevered wall.

A person skilled in the art will understand that the second seal members 36B, 38B of the two tandem seals 36, 38 may also be referred to as seal "energizers" 36B, 38B. As will be described in detail below, in operation, the seal energizers 36B, 38B perform a biasing function that biases the first seal members 36A, 38A into engagement with the blade track segment 28 (specifically a coating 28A formed on the blade track segment 28, as shown in FIG. 4). The seal energizers 36B, 38B do not provide a sealing function, as the sealing function is performed by the first seal members 36A, 38A, in particular to prevent or block gases from a gas path 15 of the gas turbine engine 10 from flowing between the carrier segment 23 and the blade track segment 28.

The gas turbine engine 10 in which the turbine shroud assembly 22, 422 of the present disclosure can be utilized includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
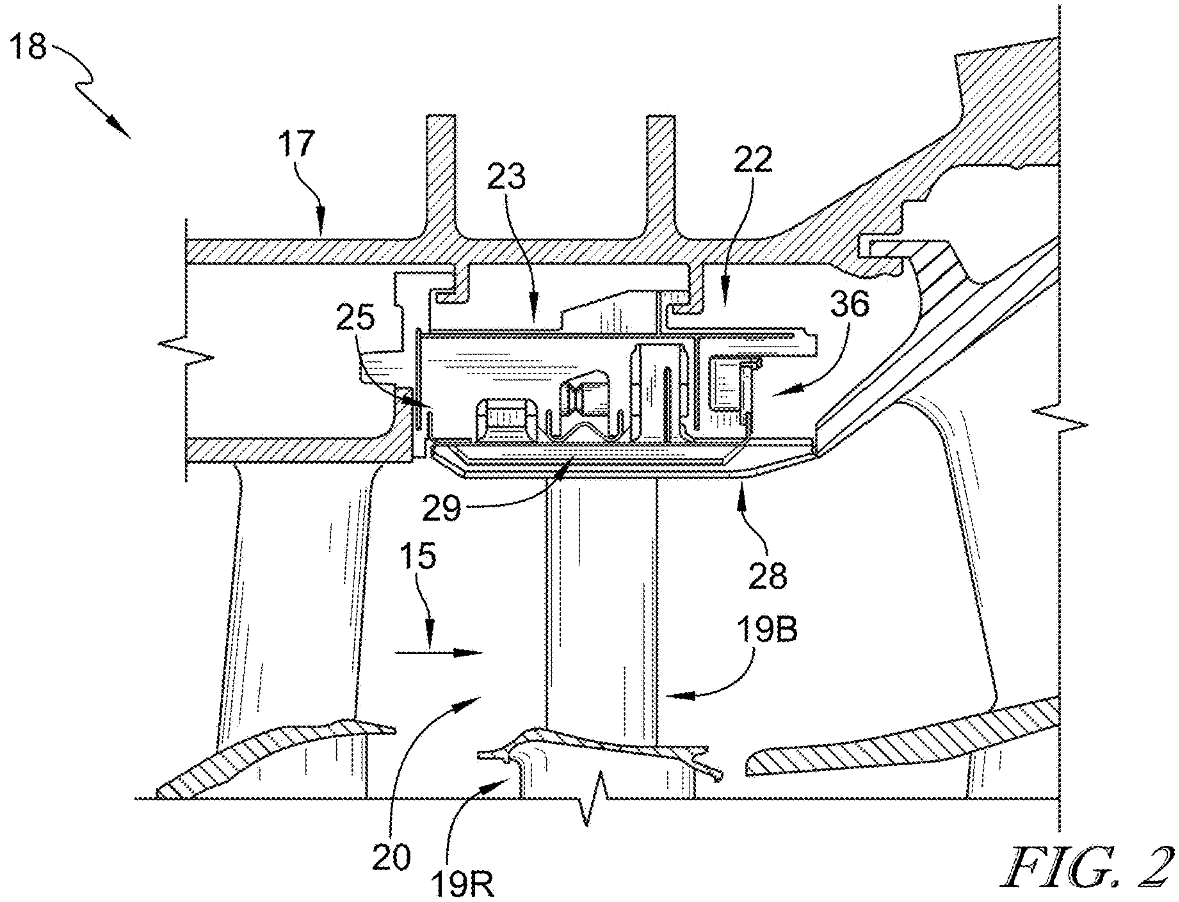
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades, and further showing the turbine shroud assembly includes a carrier segment, a blade track segment coupled to the carrier segment to define a portion of a gas path of the gas turbine engine, and a buffer air seal assembly configured to seal between the carrier segment and the blade track segment to block gases flowing through the gas path from flowing between the carrier segment and the blade track segment.

The turbine 18 includes at least one turbine wheel assembly 19 and a turbine shroud 20 positioned to surround the turbine wheel assembly 19 as shown in FIGS. 1 and 2. The turbine wheel assembly 19 includes a plurality of blades 19B coupled to a rotor disk 19R for rotation with the disk 19R. The hot, high pressure combustion products from the combustor 16 are directed toward the blades 19B of the turbine wheel assemblies 19 along the gas path 15. The turbine shroud 20 is coupled to the outer case 17 of the gas turbine engine 10 and extends around the turbine wheel assembly 19 to block gases from passing over the turbine blades 19B during use of the turbine 18 in the gas turbine engine 10.

In the illustrative embodiment, the turbine shroud 20 is made up of a number of turbine shroud segment segments 22 that each extend circumferentially partway around the axis 11 and cooperate to surround the turbine wheel assembly 19. In other embodiments, the turbine shroud 20 is annular and non-segmented to extend fully around the axis 11 and surround the turbine wheel assembly 19. In yet other embodiments, certain components of the turbine shroud 20 are segmented while other components are annular and non-segmented.

The turbine shroud segment 22 includes a carrier segment 23 arranged circumferentially at least partway around an axis 11 of the gas turbine engine 10, a blade track segment 28 arranged circumferentially at least partway around the axis 11, a mount system 31 configured to couple the carrier segment 23 to the blade track segment 28, and a seal system 34 as shown in FIGS. 2-8. The seal system 34 is configured to seal gaps between the carrier segment 23 and the blade track segment 28 to prevent or block gases from a gas path 15 of the gas turbine engine 10 from flowing between the carrier segment 23 and the blade track segment 28.

Each turbine shroud segment 22 includes the carrier segment 23, the blade track segment 28, the mount system 31, and the seal system 34, as shown in FIGS. 2-6. The carrier segment 23 and the blade track segment 28 are arranged circumferentially partway about the axis 11. Illustratively, the carrier segment 23 includes an outer wall 24, a forwardmost support wall 25, also referred to as a first support wall 25, an aftmost support wall 26, and a pair of hangers 24H. The outer wall 24 extends circumferentially at least partway about the axis 11. The hangers 24H extend radially outward from the outer wall 24 and engage the case 17 to couple the turbine shroud segment 22 to the rest of the engine 10. The first support wall 25 extends radially inward from the outer wall 24 at a forward end of the outer wall 24 axially forward of a first attachment feature 29A of the blade track segment 28, and the aft support wall 26 extends radially inward from the outer wall 24 at an aft end of the outer wall 24 axially aft of a second attachment feature 29B of the blade track segment 28.

Figure 3:
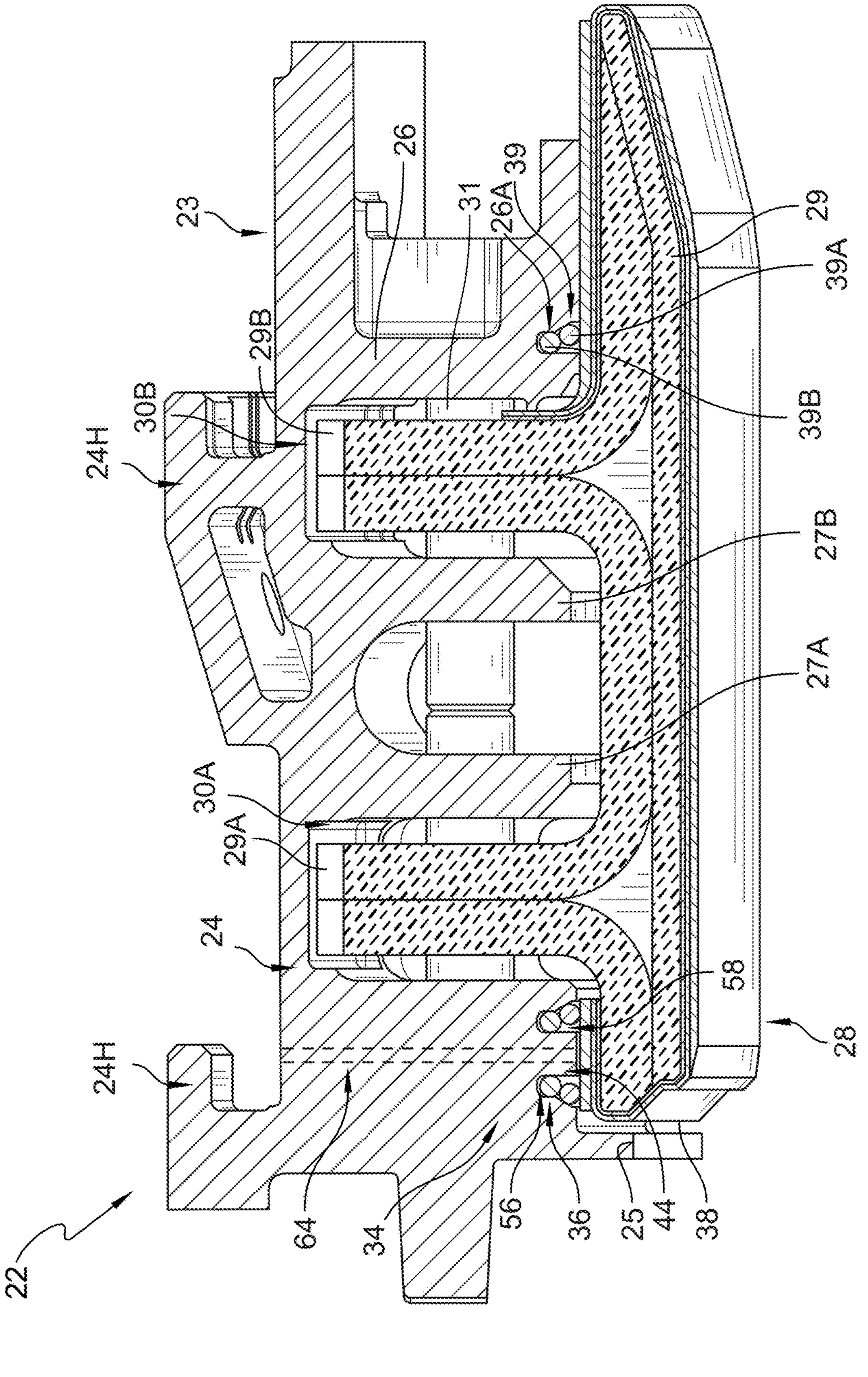
FIG. 3 is side cross-sectional view of the turbine shroud assembly of FIG. 2, showing that a first support wall of the carrier segment includes a circumferentially extending first recess having a first cantilevered wall therewithin and defining two circumferentially extending grooves, and showing that the buffer air seal assembly can include first and second tandem seals arranged within the grooves.

In the illustrative embodiment, the carrier segment 23 further includes two intermediate support walls 27A, 27B as shown in FIG. 3. The intermediate support walls 27A, 27B each extend radially inward from the outer wall 24 of the carrier segment 23 axially between the first and second support walls 25, 26. A forwardmost intermediate support walls 27A is spaced apart axially from an aftmost intermediate support walls 27B in the illustrative embodiment.

In the illustrative embodiment, the blade track segment 28 includes a shroud wall 29 that extends circumferentially partway around the axis 11 to define a portion of the gas path 15 and first and second attachment features 29A, 29B that extend radially from the shroud wall 29. The first attachment feature 29A extends into a first attachment-receiving space 30A defined between the first support wall 25 and the forwardmost intermediate support wall 27A, and the second attachment feature 29B extends into a second attachment-receiving space 30B defined between the aft support wall 26 and the aftmost intermediate support wall 27B. The mount system 31, which may be a pin or similar retainer feature, is configured to extend through the first, second, and intermediate support walls 25, 26, 27A, 27B, as well as the first and second attachment features 29A, 29B, so as to couple the blade track segment 28 to the carrier segment 23. The seal system 34 is arranged radially between the carrier segment 24 and the blade track segment 26 to seal gaps therebetween.

The blade track segment 28 is a ceramic matrix composite component configured to directly face the high temperatures of the gas path 15 of the gas turbine engine 10 to define a portion of the gas path 15. The carrier segment 23 is a metallic support component configured to interface with other metallic components of the gas turbine engine 10, such as the case 17, to support the blade track segment 28 to radially locate the blade track segment 28 relative to the axis 11. The seal system 34 is arranged radially between the carrier segment 23 and the blade track segment 28 to seal off the first attachment-receiving space 30A defined by the carrier segment 23 to block gases from flowing between the carrier segment 23 and the blade track segment 28 and into the first attachment-receiving space 30A.

During operation of a gas turbine engine 10, the hot, high-pressure products directed into the turbine 18 from the combustor 16 flow across a radially-inward facing surface of the shroud wall 29 of the blade track segment 28 that defines a portion of the gas path 15. The seal system 34 blocks the hot, high-pressure products from flowing into the first attachment-receiving space 30A of the turbine shroud segment 22.

In the illustrative embodiment, and as will be described in greater detail below, the seal system 34 includes a first tandem seal 36 and a second tandem seal 38 arranged within grooves 56, 58 defined within a circumferentially extending recess 32 formed in the first support wall 25. Each tandem seal 36, 38 includes a radially inward first seal member 36A, 38A and a radially outward second seal member 36B, 38B. The seal members 36A, 36B, 38A, 38B block the hot, high-pressure products from flowing into the first attachment-receiving space 30A of the turbine shroud segment 22. A person skilled in the art will understand that, although the description herein refers to a ceramic matrix composite blade track segment 28 and a metallic carrier segment 23, the seal system 34 and its capabilities of blocking hot, high-pressure flow from entering particular spaces can be applied to other components of an engine comprised of the same or different materials, such as, for example, a combustor liner. The application of the seal system 34 is also not limited to aircraft engines, and can be utilized in a wide variety of machinery as would be understood by a person skilled in the art.

In some embodiments, the carrier segment 23 may also include buffer air passageways to direct high-pressure air (sometimes referred to as buffer air 66) into the grooves 56, 58 formed in the carrier segment 23 to distribute the high-pressure air along the seal members 36A, 36B, 36C, 38A, 38B, 38C. The high-pressure air supplied to the grooves 56, 58 is used help keep the gases in the gas path 15 out of the first attachment-receiving space 30A in the event of a seal failure. The high-pressure or buffer air 66 is typically jetted through the seal members 36A, 36B, 38A, 38B arranged in the groove 56, 58, which may cause the seal members 36A, 36B, 38A, 38B to wear, specifically oxidize, significantly reducing the overall life of the seal members 36A, 36B, 38A, 38B and the effectiveness of the seal members 36A, 36B, 38A, 38B.

In order to mitigate such negative effects, the seal system 34 of the turbine shroud segment 22, the seal system 34, which also may be referred to as a buffer air seal assembly 34, includes first and second tandem seals 36, 38 that are each arranged in their own discrete groove 56, 58 formed in the circumferentially extending recess 32 of the carrier segment 23, and further includes at least one buffer air passageway 64 that extends axially between the first and second tandem seals 36, 38. Accordingly, instead of jetting the buffer air 66 through the seal members 36A, 36B, 38A, 38B of each seal 36, 38, the buffer air passageway 64 discharges the buffer air 66 axially between the tandem seals 36, 38 so that the seal members 36A, 36B, 38A, 38B of each tandem seal 36, 38 are positioned out of a flow path of the buffer air 66. By locating the seal members 36A, 36B, 38A, 38B out of the flow path of the discharged buffer air 66 so that buffer air 66 does not flow across the seal members 36A, 36B, 38A, 38B, the oxidation or wear of the seal members 36A, 36B, 38A, 38B is reduced, improving the life of the seal members 36A, 36B, 38A, 38B.

Figure 5:
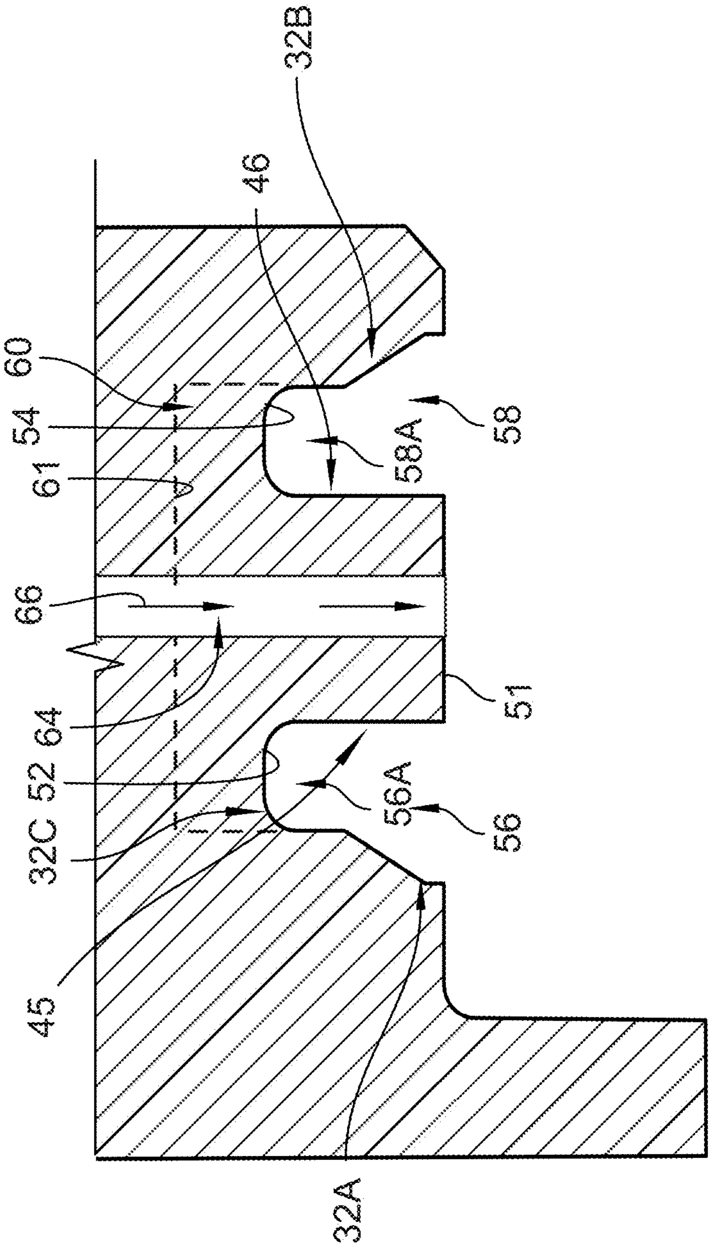
FIG. 5 is a cross-sectional magnified view of the turbine shroud assembly of FIGS. 3 and 4 taken through line 5-5 shown in FIG. 6, showing the grooves without the seals therewithin, and showing that the first support wall further includes a second recess formed at a first circumferential end of the grooves that opens radially inwardly.
Figure 6:
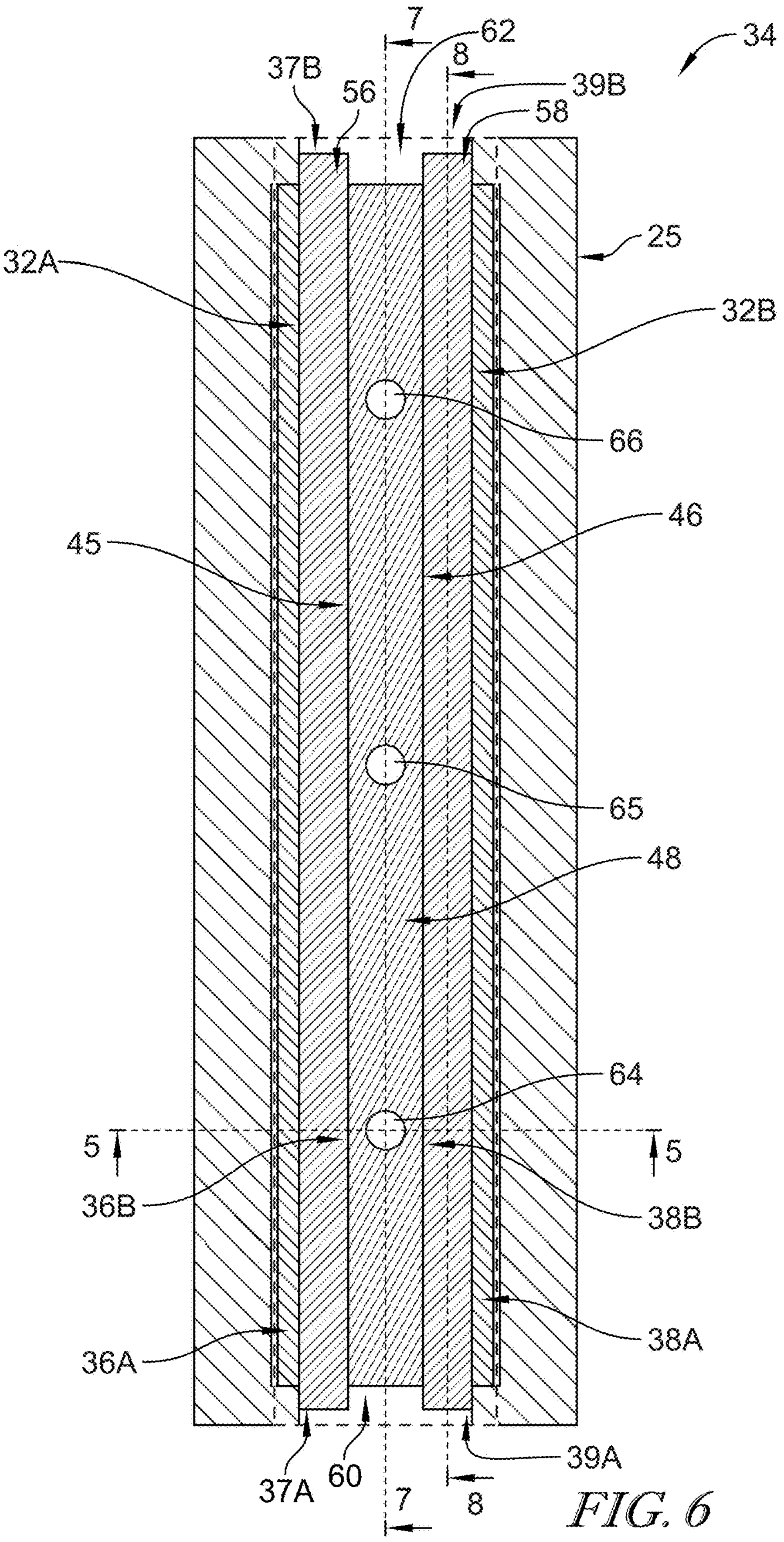
FIG. 6 is a top cross-sectional view of the turbine shroud assembly of FIGS. 3-5, showing that the first support wall further includes a third recess formed at a second circumferential end of the grooves that opens radially inwardly, and showing that the ends of the second seal members of the two tandem seals extend into the second and third recesses so as to block circumferential movement of the second seal members.

As can be seen in detail in FIGS. 4-6, the first support wall 25 of the carrier segment 23 is formed to include the recess 32 that opens radially inwardly and extends circumferentially at least partway around the axis 11. The recess 32 includes opposing inwardly and axially facing surfaces 32A, 32B, also referred to as first and second inner walls 32A, 32B herein, and a radially inwardly facing top surface 32C (which is the same as a top wall 52 of the groove 56 and a top wall 54 of the groove 58) that extends between the inner walls 32A, 32B, also referred to as a top wall 32C herein. In some embodiments, the inner walls 32A, 32B are angled relative to the radial direction (i.e. vertical direction as viewed in FIG. 4).

The first support wall 25 further includes a first cantilevered wall 42 extending radially inwardly from the top wall 32C of the recess 32 and spaced apart from the first and second inner walls 32A, 32B of the recess 32, as shown in FIGS. 4-6. The first cantilevered wall 42 is generally prismatic and extends along a circumferential length of the recess 32 along the top wall 32C. The first cantilevered wall 42 includes a radially inwardly facing bottom surface 43, and opposing axially facing outer surfaces 45, 46, also referred to as a first outer wall 45 and a second outer wall 46 herein. In some embodiments, the first cantilevered wall 42 has a radial extent that is generally equal to the radial depth of the recess 32, as shown in FIGS. 4 and 5. In some embodiments, the first and second outer walls 45, 46 are formed to be orthogonal to the top wall 32C and to the radial direction (i.e. vertical direction as viewed in FIG. 4).

Figure 7:
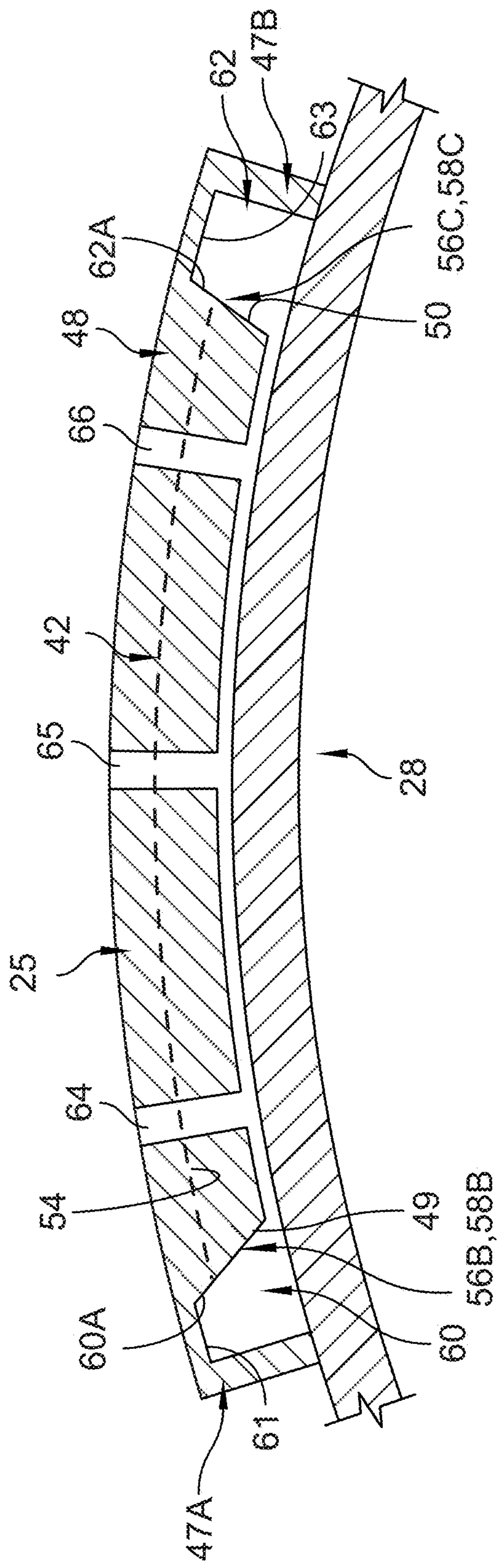
FIG. 7 is a side cross-sectional view of the turbine shroud assembly of FIGS. 3-6 taken through line 7-7 shown in FIG. 6, showing that the second and third recess are formed to be radially deeper than the grooves of the first recess.

A first groove 56 is formed between the first inner wall 32A of the recess 32 and the first outer wall 45 of the first cantilevered wall 42, as shown in FIG. 4. Similarly, a second groove 58 is formed between the second inner wall 32B of the recess 32 and the second outer wall 46 of the first cantilevered wall 42. In some embodiments, the first support wall 25 may be formed to include end stops 47A, 47B at the circumferentially terminal ends of the grooves 56, 58, as shown in FIG. 7. The first support wall 25 further includes the at least one buffer air passageway 64 that extends radially through the first support wall 25 and the first cantilevered wall 42. The buffer air passageway 64 opens at the bottom surface 43 of the first cantilevered wall 42 and is configured to discharge buffer air 66 axially between the tandem seals 36, 38. In some embodiments, the first support wall 25 can include three or more buffer air passageways 64, 65, 66 as shown in FIG. 6.

As can be seen in phantom lines in FIG. 5, in a top view in FIG. 6, and an axially facing view in FIG. 7, the first support wall 25 is formed to further include a second recess 60 located at a first circumferential end 56B, 58B of the grooves 56, 58 that opens radially inwardly and a third recess 62 located at a second circumferential end 56C, 58C of the grooves 56, 58 opposite the first circumferential end 56B, 58B that also opens radially inwardly. As shown in FIGS. 5-7 the second and third recesses 60, 62 are formed to be radially deeper (i.e. have a greater radial depth) than the first recess 32 and thus the grooves 56, 58. In other words, the second and third recesses 60, 62 each include an inwardly facing top wall 61, 63 that is radially outwardly spaced apart from the top wall 32C (top walls 52, 54 of the grooves 56, 58) of the first recess 32. FIG. 7 shows the top wall 54 of the second groove 58 in phantom lines to provide context to the radial depth of the second and third recesses 60, 62.

Illustratively, as shown in FIG. 5, the second and third recesses 60, 62 have an axial width that is approximately equal to the axial width of the area of the recess 32 in which the second seal members 36B, 38B are arranged (i.e. the radially outward portions 56A, 58A of the grooves 56, 58 within which the second seal members 36B, 38B are arranged). In this way, the grooves 56, 58 can each open entirely into the second and third recesses 60, 62. In some embodiments, each recess 60, 62 may include a circumferentially inner wall 60A, 62A that are coplanar with circumferentially outer walls 49, 50 (i.e. end walls 49, 50) of the first cantilevered wall 42, as shown in FIG. 7. In some embodiments, both of the outer walls 49, 50 and the circumferentially inner walls 60A, 62A are angled circumferentially outwardly, as shown in FIG. 7.

As shown in FIGS. 3-8, the buffer air seal assembly 34 includes a first tandem seal 36 arranged in the first groove 56 and a second tandem seal 38 arranged in the second groove 58. Each tandem seal 36, 38 includes a first seal member 36A, 38A and a second seal member 36B, 38B. The seal members 36A, 36B, 38A, 38B each extend circumferentially at least partway about the axis 11. The second seal members 36B, 38B are arranged radially outward of the first seal member 36A, 38A in the corresponding groove 56, 58 so that the second seal members 36B, 38B are positioned out of the flow path of the buffer air 66 to reduce oxidation of the second seal members 36B, 38B.

As suggested by FIG. 4, the seal members 36A, 36B, 38A, 38B, are positioned against the first and second inner walls 32A, 32B of the recess 32. Because in the illustrative embodiment the first and second inner walls 32A, 32B are angled, the first seal members 36A, 38A are positioned slightly axially outward of the second seal members 36B, 38B.

Figure 8:
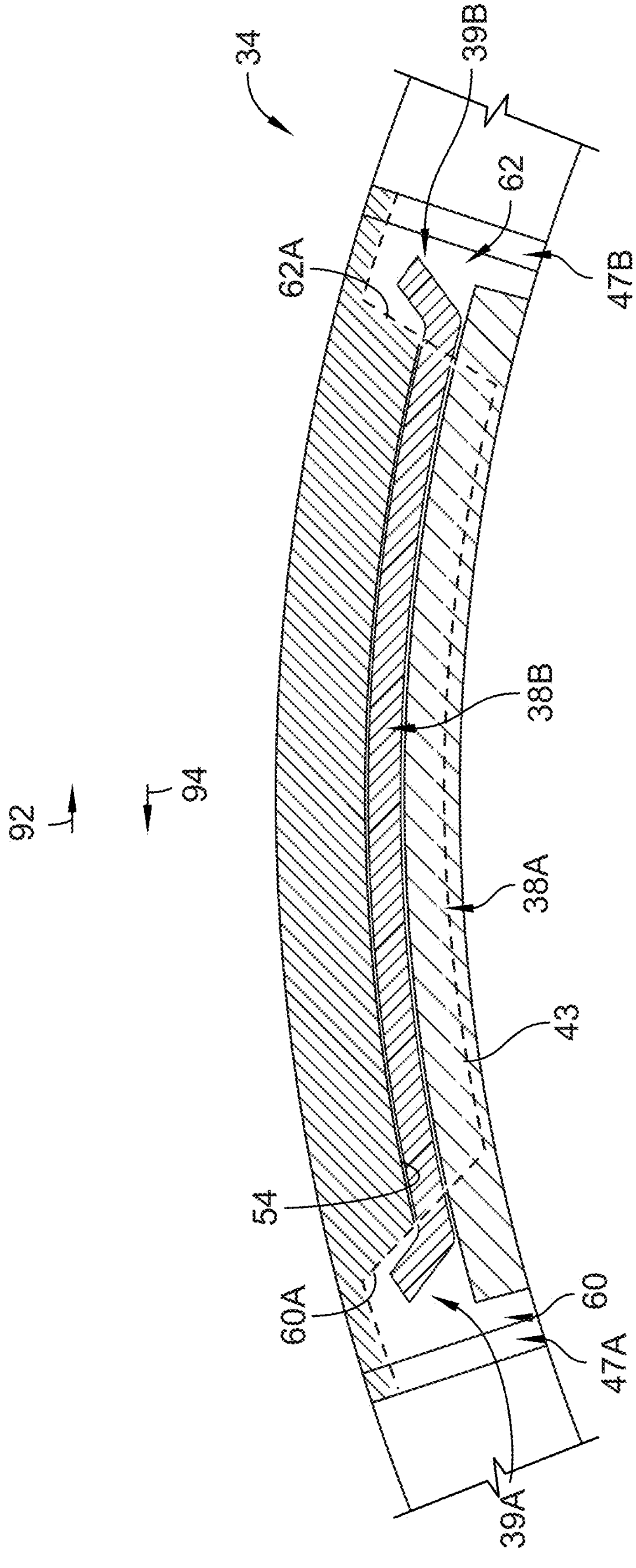
FIG. 8 is a side cross-sectional view of the turbine shroud assembly of FIGS. 3-7 taken through line 8-8 shown in FIG. 6, showing that the ends of the second seal members can fold radially outwardly into the second and third recesses.

As briefly described above, the second seal members 36B, 38B are configured to extend into the second and third recesses 60, 62, as shown in detail in FIGS. 6 and 8. Illustratively, circumferentially terminal ends 37A, 37B, 39A, 39B of the second seal members 36B, 38B are configured to extend circumferentially beyond the circumferential ends 56B, 58B, 56C, 58C of the grooves 56, 58 (i.e. at the circumferential outer walls 49, 50 of the first cantilevered wall 42). Accordingly, the circumferentially terminal ends 37A, 37B, 39A, 39B that extend into the second and third recesses 60, 62 can be folded at least partially radially outwardly into the second and third recesses 60, 62, as shown in FIG. 8.

Accordingly, the circumferentially terminal ends 37A, 37B, 39A, 39B are configured to abut the circumferentially inner walls 60A, 62A of the second and third recesses 60, 62 so as to block circumferential movement of the second seal members 36B, 38B. In other words, the first circumferential terminal ends 37A, 39A of the second seal members 36B, 38B are configured to abut the inner wall 60A of the second recess 60 to block movement of the second seal members 36B, 38B in a first circumferential direction 92, as shown in FIG. 8. The second circumferential terminal ends 37B, 39B of the second seal members 36B, 38B are configured to abut the inner wall 62A of the third recess 62 to block movement of the second seal members 36B, 38B in a second circumferential direction 94 opposite the first circumferential direction 92.

The end stops 47A, 47B shown in FIG. 7 can also be configured to block circumferential movement of the first seal members 36A, 38A. Moreover, in some embodiments, the grooves 56, 58 can be formed to have a slightly larger circumferential length than the first seal members 36A, 38A to allow for play and/or thermal expansion within the grooves 56, 58. Similarly, the grooves 56, 58 can be formed to have a slightly larger circumferential length than a length of the second seal members 36B, 38B to allow for play and/or thermal expansion within the grooves 56, 58.

Illustratively, the first seal member 36A, 38A of each tandem seal 36, 38 is a wire seal or a single strand of solid metallic material. The second seal members 36B, 38B of each tandem seal 36, 38 are configured to be compressed between the carrier segment 23 and the first seal member 36A, 38A to bias the first seal members 36A, 38A into engagement with the shroud wall 29 of the blade track segment 28, as suggested in FIG. 4. In some embodiments, the first seal members 36A, 38A are biased into engagement with a coating 28A that surrounds the portion of the shroud wall 29 that comes into contact with the seal members 36A, 38A.

In the illustrative embodiment, the second seal members 36B, 38B, are a braid of metallic material, sometimes also referred to as a braid seal. The second seal members 36B, 38B are a single braid of metallic material in the illustrative embodiment. In some embodiments, the second seal members 36B, 38B comprise a ceramic-containing core surrounded by the braid of metallic material. The braid of metallic material may form an overbraid sheath around the ceramic core.

In some embodiments, the seal system 34 may further include an aft seal assembly 39 (including similar tandem seals as described above) arranged in a recess 26A formed in the second support wall 26, as shown in FIG. 3. The buffer air seal assembly 34 is located near a forward edge of the blade track segment 28. The aft seal assembly 39 is located near an aft edge of the blade track segment 28. The carrier segment 23 may further include a buffer air passageway at the aft seal assembly 39 similar to the buffer air passageway 64 described above in some embodiments.

Like the buffer air seal assembly 34, the tandem seal of the aft seal assembly 39 includes a first seal member 39A and a second seal member 39B, as shown in FIG. 3. The first seal member 39A and the second seal member 39B each extend circumferentially at least partway about the axis 11. The second seal member 39B is arranged radially outward of the first seal member 39A in the recess 26A and configured to be compressed between the carrier segment 23 and the first seal member 39A to bias the first seal member 39A into engagement with the shroud wall 29 of the blade track segment 28 as suggested in FIG. 3.

FIGS. 9-11 show alternative configurations of the second seal members 36B, 38B described above, in particular configurations that block circumferential movement of the second seal members 36B, 38B. The alternative configurations shown in FIGS. 9-11 are configured to be utilized with a turbine shroud segment substantially similar to the turbine shroud segment 22 described above and shown in FIGS. 3-8. Accordingly, similar reference numbers in the 100, 200, and 300 series, in particular with regard to the buffer air seal assemblies 134, 234, 334, indicate features that are common with the turbine shroud segment 22, in particular with the buffer air seal assembly 34. The description of the turbine shroud segment 22 and the buffer air seal assembly 34 is incorporated by reference to apply to the buffer air seal assemblies 134, 234, 334, except in instances when they conflict with the specific description and the drawings of the buffer air seal assemblies 134, 234, 334.

Similar to the buffer air seal assembly 34 described above, FIG. 9 shows the second seal member 138B having circumferentially terminal ends 139A, 139B that extend into the second and third recesses 160, 162. It is noted that the second seal member 136B is not shown due to the view of FIG. 9, but is formed similar to the second seal member 138B shown in FIG. 9. In this embodiment, the circumferentially terminal ends 139A, 139B of the second seal member 138B are configured to be folded or curled over inwardly towards the circumferentially inner walls 160A, 162A of the second and third recesses 160, 162 so as to block circumferential movement of the second seal member 138B. In some embodiments, the end surfaces 139C, 139D can contact the circumferentially inner walls 160A, 162A so as to provide additional resistance to circumferential movement of the second seal member 138B.

Similar to the buffer air seal assembly 34 described above, FIG. 10 shows the second seal member 238B having circumferentially terminal ends 239A, 239B that extend into the second and third recesses 260, 262. It is noted that the second seal member 236B is not shown due to the view of FIG. 10, but is formed similar to the second seal member 238B shown in FIG. 10. In this embodiment, the circumferentially terminal ends 239A, 239B of the second seal member 238B are configured to be welded over each other to form knots 239C, 239D that are configured to abut the circumferentially inner walls 260A, 262A of the second and third recesses 260, 262 and thus block circumferential movement of the second seal member 238B.

Similar to the buffer air seal assembly 34 described above, FIG. 11 shows the second seal member 338B having circumferentially terminal ends 339A, 339B that extend into the second and third recesses 360, 362. It is noted that the second seal member 336B is not shown due to the view of FIG. 11, but is formed similar to the second seal member 338B shown in FIG. 11. In this embodiment, the circumferentially terminal ends 339A, 339B of the second seal member 338B are configured to bent at approximately an orthogonal angle in order to crimp the ends 339A, 339B. Also in this embodiment, the circumferentially inner walls 360A, 362A, as well as the outer walls 349, 350 of the first cantilevered wall 342, are formed to be generally orthogonal to the bottom surface 343 of the first cantilevered wall 342. Accordingly, the crimped circumferentially terminal ends 339A, 339B of the second seal member 338B are configured to abut the orthogonally formed circumferentially inner walls 360A, 362A of the recesses 360, 362 and the outer walls 349, 350 of the first cantilevered wall 342 so as to block circumferential movement of the second seal member 338B.

Another embodiment of turbine shroud segment 422 is shown in FIGS. 12 and 13. The turbine shroud segment 422 is similar to the turbine shroud segment 22 shown in FIGS. 2-11 and described herein. Moreover, the buffer air seal assemblies 34, 134, 234, 334 described herein are all configured to be utilized in the turbine shroud segment 422. Accordingly, similar reference numbers in the 400 series indicate features that are common between the turbine shroud segment 422 and the turbine shroud segment 22 and the buffer air seal assemblies 34, 134, 234, 334. The description of the turbine shroud segment 22 and the buffer air seal assemblies 34, 134, 234, 334 are incorporated by reference to apply to the turbine shroud segment 422, except in instances when they conflict with the specific description and the drawings of turbine shroud segment 422.

Similar to the turbine shroud segment 22 described above, the turbine shroud segment 422 includes a first support wall 425 of a carrier segment 423 having a recess 432 formed therein. A first cantilevered wall 442 is formed in the recess 432 and includes two grooves 456, 458.

Unlike the first cantilevered wall 42 described above, the first cantilevered wall 442 of this embodiment includes angled outer walls 445, 446. In particular, as shown in FIG. 13, the first and second outer walls 445, 446 are formed to be angled relative to the radial direction (i.e. vertical direction as viewed in FIG. 13). Illustratively, the inner walls 432A, 432B are also angled relative to the radial direction (i.e. vertical direction as viewed in FIG. 13). In some embodiments, the inner walls 432A, 432B and the first and second outer walls 445, 446 are formed to be parallel with each other. In this way, the second seal members 436B,438B can securely fit within the grooves 456, 458 without allowing for much or any axial or radial play within the grooves 456, 458. In some embodiments, the top walls 452, 454 may extend orthogonally relative to the outer walls 445, 446 and the inner walls 432A, 432B, as shown in FIG. 12. In other embodiments, the top walls 452, 454 may extend generally parallel to the axis 11, as shown in FIG. 13.

FIG. 13 also shows that the second recess 460 may be formed similarly to the second recess 60 described above. Although not shown due to the view of FIG. 13, the third recess 462 is formed substantially the same as the second recess 460. As can be seen in FIG. 13, the second recess 460 has an axial width that is approximately equal to the axial width of the area of the recess 432 in which the second seal members 436B,438B are arranged (i.e. the radially outward portions 456A, 458A of the grooves 456, 458 within which the second seal members 436B, 438B are arranged). In this way, the grooves 456, 458 can each open entirely into the second and third recesses 460, 462.

A method according to a further aspect of the present disclosure includes a first operational step of arranging a carrier segment 23 made of metallic materials circumferentially at least partway around an axis 11, the carrier segment 23 including an outer wall 24 and a first support wall 25 that extends radially inward from the outer wall 24. The method includes a second operational step of forming the first support wall 25 to include a first recess 32 that opens radially inwardly and extends circumferentially at least partway around the axis 11, and a first cantilevered wall 42 extending radially inwardly from a first recess top wall 32C of the first recess 32 and spaced apart from opposing inner walls 32A, 32B of the first recess 32 so as to form a first groove 56 between a first inner wall 32A of the first recess 32 and a first outer wall 45 of the first cantilevered wall 42 that faces the first inner wall 32A, the first cantilevered wall 42 and the first groove 56 extending circumferentially at least partway around the axis 11.

The method includes a third operational step of forming at least one buffer air passageway 64 in the carrier segment 23 that extends radially through the first support wall 25 and the first cantilevered wall 42 and is configured to discharge high-pressure buffer air 66. The method includes a fourth operational step of forming the first support wall 25 to further include a second recess 60 located at a first circumferential end 56B, 58B of the first groove 56 that opens radially inwardly, wherein the second recess 60 includes a second recess top wall 61 that is radially outwardly spaced apart from the first recess top wall 32C such that a second radial depth of the second recess 60 is greater than a first radial depth of the first recess 32.

The method includes a fifth operational step of coupling an attachment feature 29A, 29B of a blade track segment 28 made of ceramic matrix composite materials to the carrier segment 23, the blade track segment 28 including a shroud wall 29 that extends circumferentially partway around the axis 11. The method includes a sixth operational step of arranging a buffer air seal assembly 34 radially between the carrier segment 23 and the shroud wall 29 of the blade track segment 28, the buffer air seal assembly 34 including a first tandem seal 36 arranged in the first groove 56, wherein the first tandem seal 36 includes first and second seal members 36A, 36B that each extend circumferentially at least partway about the axis 11, wherein the second seal member 36B is arranged radially outward of the first seal member 36A within the first groove 56. The method includes a seventh operational step of arranging the second seal member 36B such that a first end of the second seal member extends circumferentially beyond the first circumferential end of the first groove, wherein the first end 37A of the second seal member 36B extends at least partially radially outwardly into the second recess 60 so as to block movement of the second seal member 36B in a first circumferential direction 92.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising a carrier segment made of metallic materials and arranged circumferentially at least partway around an axis, the carrier segment including an outer wall, a first support wall that extends radially inward from the outer wall and is formed to include a first recess that opens radially inwardly and extends circumferentially at least partway around the axis, and a first cantilevered wall extending radially inwardly from a first recess top wall of the first recess and spaced apart from opposing inner walls of the first recess so as to form a first groove between a first inner wall of the first recess and a first outer wall of the first cantilevered wall that faces the first inner wall, the first cantilevered wall and the first groove extending circumferentially at least partway around the axis, the carrier segment further including at least one buffer air passageway that extends radially through the first support wall and the first cantilevered wall and is configured to discharge high-pressure buffer air, the first support wall being formed to further include a second recess located at a first circumferential end of the first groove that opens radially inwardly, wherein the second recess includes a second recess top wall that is radially outwardly spaced apart from the first recess top wall such that a second radial depth of the second recess is greater than a first radial depth of the first recess, a blade track segment made of ceramic matrix composite materials and including a shroud wall that extends circumferentially partway around the axis and an attachment feature configured to be coupled to the carrier segment, and a buffer air seal assembly located radially between the carrier segment and the shroud wall of the blade track segment and including a first tandem seal arranged in the first groove, wherein the first tandem seal includes first and second seal members that each extend circumferentially at least partway about the axis, wherein the second seal member is arranged radially outward of the first seal member within the first groove, wherein a first end of the second seal member extends circumferentially beyond the first circumferential end of the first groove, and wherein the first end of the second seal member extends at least partially radially outwardly into the second recess so as to block movement of the second seal member in a first circumferential direction.

2. The turbine shroud assembly of claim 1, wherein the first support wall is further formed to include a third recess located at a second circumferential end of the first groove opposite the first circumferential end that opens radially inwardly.

3. The turbine shroud assembly of claim 2, wherein the third recess includes a third recess top wall that is radially outwardly spaced apart from the first recess top wall such that a third radial depth of the third recess is greater than the first radial depth of the first recess, wherein a second end of the second seal member opposite the first end extends circumferentially beyond the second circumferential end of the first groove, and wherein the second end of the second seal member extends at least partially radially outwardly into the third recess so as to block movement of the second seal member in a second circumferential direction opposite the first circumferential direction.

4. The turbine shroud assembly of claim 3, wherein the first support wall of the carrier segment is further formed to include a second groove between a second inner wall of the first recess opposite the first inner wall and a second outer wall of the first cantilevered wall that faces the second inner wall and is opposite the first outer wall.

5. The turbine shroud assembly of claim 4, wherein the second and third recesses each have an axial width that enables both of the first groove and the second groove to open into the second and third recesses.

6. The turbine shroud assembly of claim 5, wherein the buffer air seal assembly further includes a second tandem seal arranged in the second groove and including third and fourth seal members that each extend circumferentially at least partway about the axis, and wherein the fourth seal member is arranged radially outward of the third seal member within the second groove.

7. The turbine shroud assembly of claim 6, wherein a first end of the fourth seal member extends circumferentially beyond a first circumferential end of the second groove, wherein a second end of the fourth seal member extends circumferentially beyond a second circumferential end of the second groove, and wherein the first and second end of the fourth seal member extend at least partially radially outwardly into the second and third recesses, respectively, so as to block movement of the fourth seal member in the first and second circumferential directions.

8. The turbine shroud assembly of claim 1, wherein the at least one buffer air passageway includes a plurality of buffer air passageways that are circumferentially spaced apart and extend through the first cantilevered wall.

9. The turbine shroud assembly of claim 1, wherein the first support wall is a forwardmost support wall of the carrier segment.

10. The turbine shroud assembly of claim 1, wherein the first seal member is a wire seal and the second seal member is a braid seal that is compressible, and wherein the second seal member is configured to be compressed between the carrier segment and the first seal member to bias the first seal member into engagement with the shroud wall of the blade track segment.

11. The turbine shroud assembly of claim 10, wherein the second seal member comprises a braid of metallic material, and wherein the second seal member comprises a ceramic-containing core surrounded by the braid of metallic material.

12. The turbine shroud assembly of claim 11, wherein the first seal member comprises a single strand of solid metallic material.

13. A turbine shroud assembly for use with a gas turbine engine, the turbine shroud assembly comprising a carrier segment including a first support wall including a first recess that opens radially inwardly, a first cantilevered wall within the first recess and a first groove formed between a first inner wall of the first recess and the first cantilevered wall, the first cantilevered wall and the first groove extending circumferentially at least partway around the axis, the first support wall further including a second recess located at a first circumferential end of the first groove that opens radially inwardly, a blade track segment coupled to the carrier segment, and a buffer air seal assembly including a first tandem seal arranged in the first groove, wherein the first tandem seal includes first and second seal members that each extend circumferentially at least partway about the axis, wherein a first end of the second seal member extends circumferentially beyond the first circumferential end of the first groove, and wherein the first end of the second seal member extends at least partially radially outwardly into the second recess so as to block movement of the second seal member in a first circumferential direction.

14. The turbine shroud assembly of claim 13, wherein the second recess includes a second recess top wall that is radially outwardly spaced apart from a first recess top wall of the first recess such that a second radial depth of the second recess is greater than a first radial depth of the first recess.

15. The turbine shroud assembly of claim 14, wherein the carrier segment further including a buffer air passageway that extends radially through the first support wall and the first cantilevered wall, wherein the buffer air seal assembly is located radially between the carrier segment and a shroud wall of the blade track segment, and wherein the second seal member is arranged radially outward of the first seal member.

16. The turbine shroud assembly of claim 15, wherein the first support wall is further formed to include a third recess located at a second circumferential end of the first groove opposite the first circumferential end that opens radially inwardly.

17. The turbine shroud assembly of claim 16, wherein the third recess includes a third recess top wall that is radially outwardly spaced apart from the first recess top wall such that a third radial depth of the third recess is greater than the first radial depth of the first recess, wherein a second end of the second seal member opposite the first end extends circumferentially beyond the second circumferential end of the first groove, and wherein the second end of the second seal member extends at least partially radially outwardly into the third recess so as to block movement of the second seal member in a second circumferential direction opposite the first circumferential direction.

18. The turbine shroud assembly of claim 13, wherein the first support wall of the carrier segment is further formed to include a second groove between a second inner wall of the first recess opposite the first inner wall and the first cantilevered wall, and wherein the second and third recesses each have an axial width that enables both of the first groove and the second groove to open into the second and third recesses.

19. The turbine shroud assembly of claim 18, wherein the buffer air seal assembly further includes a second tandem seal arranged in the second groove and including third and fourth seal members that each extend circumferentially at least partway about the axis, wherein the fourth seal member is arranged radially outward of the third seal member within the second groove, wherein a first end of the fourth seal member extends circumferentially beyond a first circumferential end of the second groove, wherein a second end of the fourth seal member extends circumferentially beyond a second circumferential end of the second groove, and wherein the first and second end of the fourth seal member extend at least partially radially outwardly into the second and third recesses, respectively, so as to block movement of the fourth seal member in the first and second circumferential directions.

20. A method comprises arranging a carrier segment made of metallic materials circumferentially at least partway around an axis, the carrier segment including an outer wall and a first support wall that extends radially inward from the outer wall, forming the first support wall to include a first recess that opens radially inwardly and extends circumferentially at least partway around the axis, and a first cantilevered wall extending radially inwardly from a first recess top wall of the first recess and spaced apart from opposing inner walls of the first recess so as to form a first groove between a first inner wall of the first recess and a first outer wall of the first cantilevered wall that faces the first inner wall, the first cantilevered wall and the first groove extending circumferentially at least partway around the axis, forming at least one buffer air passageway in the carrier segment that extends radially through the first support wall and the first cantilevered wall and is configured to discharge high-pressure buffer air, forming the first support wall to further include a second recess located at a first circumferential end of the first groove that opens radially inwardly, wherein the second recess includes a second recess top wall that is radially outwardly spaced apart from the first recess top wall such that a second radial depth of the second recess is greater than a first radial depth of the first recess, coupling an attachment feature of a blade track segment made of ceramic matrix composite materials to the carrier segment, the blade track segment including a shroud wall that extends circumferentially partway around the axis, arranging a buffer air seal assembly radially between the carrier segment and the shroud wall of the blade track segment, the buffer air seal assembly including a first tandem seal arranged in the first groove, wherein the first tandem seal includes first and second seal members that each extend circumferentially at least partway about the axis, wherein the second seal member is arranged radially outward of the first seal member within the first groove, and arranging the second seal member such that a first end of the second seal member extends circumferentially beyond the first circumferential end of the first groove, wherein the first end of the second seal member extends at least partially radially outwardly into the second recess so as to block movement of the second seal member in a first circumferential direction.

* * * * *